United States Patent

Paolucci

(12) United States Patent
(10) Patent No.: US 6,471,135 B2
(45) Date of Patent: Oct. 29, 2002

(54) ADJUSTMENT AND CONTROL UNIT FOR GAS BURNER VALVES WITH BIMETAL ROD-AND-TUBE THERMOSTAT

(76) Inventor: Margherita Paolucci, Via Baruzzi 3, 35129 Padova (IT)

(*) Notice: Subject to any disclaimer, the term of this patent is extended or adjusted under 35 U.S.C. 154(b) by 0 days.

(21) Appl. No.: 09/865,561

(22) Filed: May 29, 2001

(65) Prior Publication Data

US 2001/0050315 A1 Dec. 13, 2001

(30) Foreign Application Priority Data

Jun. 2, 2000 (IT) .................................. PD2000A000149

(51) Int. Cl.[7] .......................... G05D 23/02; H01H 37/12
(52) U.S. Cl. ................................ 236/102; 236/DIG. 1; 337/392
(58) Field of Search .................... 236/96, 102, 101 R, 236/DIG. 1; 337/392

(56) References Cited

U.S. PATENT DOCUMENTS 2,328,642 A * 9/1943 Green et al. .............. 236/21 R
2,626,753 A * 1/1953 Merrill .................... 236/102 X

* cited by examiner

*Primary Examiner*—William Wayner
(74) *Attorney, Agent, or Firm*—Guido Modiano; Albert Josif; Daniel O'Byrne

(57) ABSTRACT

An adjustment and control unit for gas burner valves provided with a bimetal rod-and-tube thermostat which is arranged on a rocker supporting the flow control element of a valve. A translational motion actuator is arranged so as to push on the rocker, on the opposite side with respect to the thermostat, and is kinematically connected to a knob by way of coupling elements which convert rotary motion into a translational motion. The coupling elements provide two distinct transmission ratios, each at specific rotation positions.

10 Claims, 1 Drawing Sheet

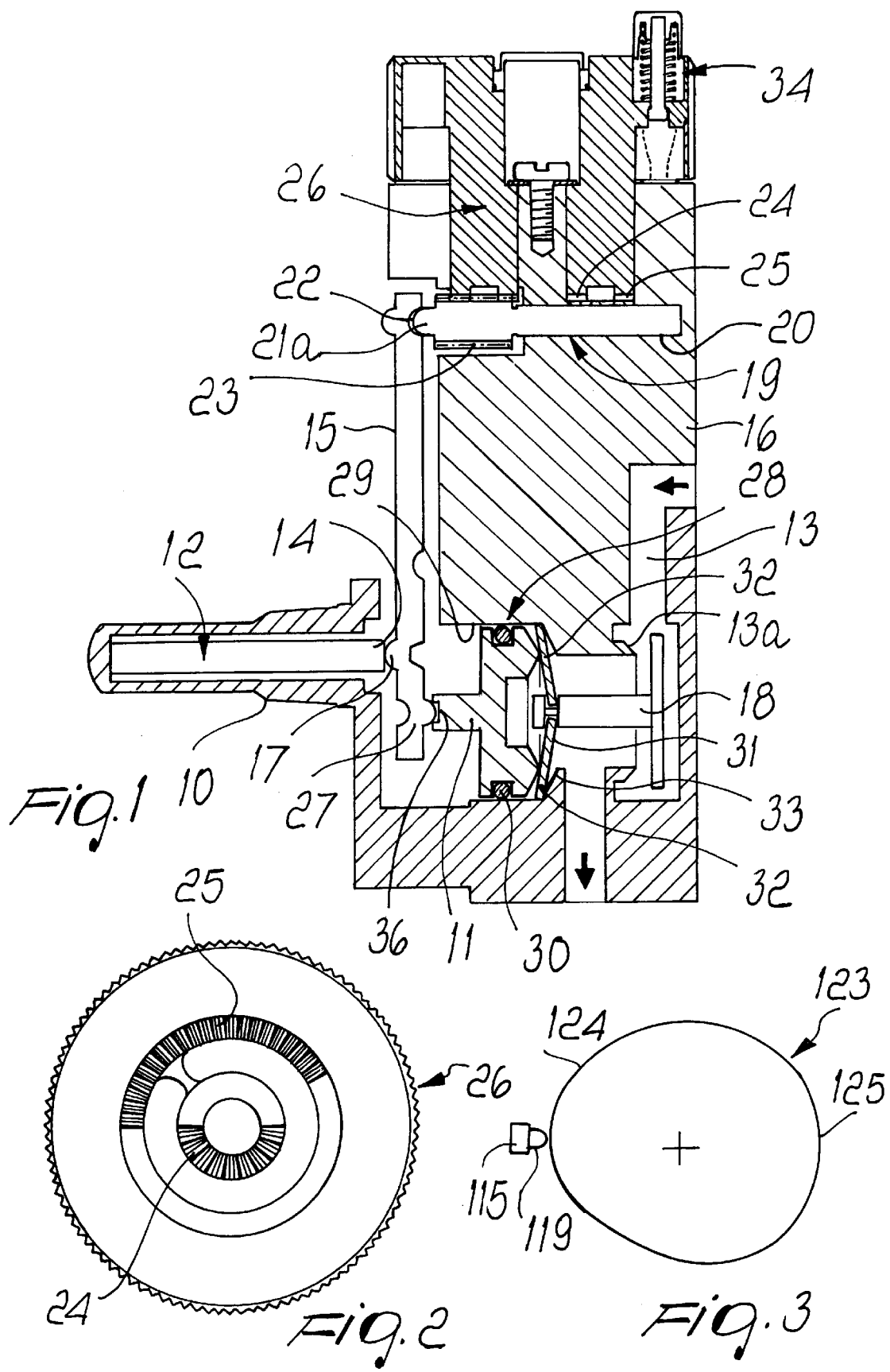

ADJUSTMENT AND CONTROL UNIT FOR GAS BURNER VALVES WITH BIMETAL ROD-AND-TUBE THERMOSTAT

BACKGROUND OF THE INVENTION

The present invention relates to an adjustment and control unit for gas burner valves provided with a bimetal rod-and-tube thermostat.

Conventional adjustment and control units for gas burner valves provided with a bimetal rod-and-tube thermostat comprise two flow control elements for the main burner and corresponding knobs for the adjustment and control of the flow control elements.

One of such flow control elements is used to set the temperature and the other one is used to close the main flow during the ignition of the flame of the pilot burner.

SUMMARY OF THE INVENTION

The aim of the present invention is to provide an adjustment and control unit for gas burner valves provided will a bimetal rod-and-tube thermostat which achieves the adjustment and control functions by means of a single knob.

Within this aim, a consequent primary object is to reduce the number of components required for the adjustment and control of gas burner valves provided with a bimetal rod-and-tube thermostat.

Another object is to provide operationally easier adjustment and control of gas burner valves.

Another object is to provide an adjustment and control unit which can be manufactured at low cost with conventional equipment and systems.

This aim and these and other objects which will become better apparent hereinafter are achieved by an adjustment and control unit for gas burner valves provided with a bimetal rod-and-tube thermostat, characterized in that said thermostat is arranged at right angles on a rod-like element which acts on the flow control element of a valve, a translational motion actuator being arranged so as to push at right angles on said rod-like element on the opposite side with respect to the thermostat, the actuator being connected to a knob by way of a coupling which converts rotary motion into a translational motion with two distinct transmission ratios, each at specific rotation positions.

BRIEF DESCRIPTION OF THE DRAWINGS

Further characteristics and advantages of the unit according to the invention will become better apparent from the detailed description of preferred embodiments thereof, illustrated only by way of non-limitative example in the accompanying drawings, wherein:

FIG. 1 is a sectional view of a unit according to the invention;

FIG. 2 is bottom view of a knob included in the unit of FIG. 1;

FIG. 3 is a view of a second embodiment of the unit of FIG. 1.

DESCRIPTION OF THE PREFERRED EMBODIMENTS

With reference to FIGS. 1 and 2, a conventional bimetal rod-and-tube thermostat 12 is arranged in an extension 10 of a vessel such as a boiler for heating water, not shown for sake of simplicity.

The thermostat 12 rests at one end, with its sensitive element 14, in a pivotal arrangement on a rod-like element 15 being arranged at right angles.

The rod-like element 15 has, at the region of contact with the sensitive element 14, a convex spherical shape 17 which is obtained by relief molding so that contact occurs substantially on one point.

The rod-like element 15 rests with its end, by means of a protrusion 27 thereof having a spherical shape and lying opposite the convex spherical shape 17, on the stem 11 of a mushroom-shaped element 28 being slideable in an appropriately provided seat 29 of the valve body 16, with which it forms a seal by way of a circumferential O-ring 30.

The head of the mushroom-shaped element 28 pushes against a bistable elastic laminar element 31 which rests, at its ends 32, on an abutment step 33 of the seat 29 and rigidly supports a flow control element 18 which controls, on a seat 13a, a gas path 13 provided in the valve body 16 and connected in input from the safety.

The spherical shape 27 of the rod-like element 15 is accommodated in a corresponding recess 36 of the head of the stem of the flow control element 18.

A translational motion actuator 19 pushes at right angles on the opposite side on the rod-like element 15, is arranged so that its axis is parallel to the axis of the thermostat 12, and is constituted in practice by a pin with a threaded portion 20 being coupled to a complementarily threaded portion of the valve body 16 in which it is inserted.

The actuator 19 has a spherical head 21a being accommodated in a corresponding recess 22 which is formed, again by molding, in the rod-like element 15.

The rod-like element 15 substantially constitutes a rocker owing to its arrangement.

The actuator 19 also has coupling means constituted by a gear-shaped portion 23 which engages, according to the rotation position, corresponding sectors 24 and 25 of crown gears formed on a knob, generally designated by the reference numeral 26, which is rotatably coupled to the body 16 and supports a conventional control for opening the safety system, generally designated by the reference numeral 34.

The sectors 24 and 25 are arranged at two different radii of curvature and accordingly provide different transmission ratios with the screw-shaped portion 23 of the actuator 19, whose axial extension is such that it always meshes, in any of its operating translatory positions, with one of the two sectors 24 and 25.

In a second embodiment, (see FIG. 3), the translational motion actuator 19, the toothed portion 23 and the sectors 24, 25 can be replaced with a cam 123 with two portions 124 and 125 which constitute said coupling means and are conveniently shaped and act on a pusher 119 which can be provided directly on the rocker element 115.

The pusher 119 can be rigidly coupled to or provided monolithic with the knob 26.

As regards operation, for example for switching on a water heater, first of all the knob is set for example to a temperature of −20° Celsius.

In such conditions, if the boiler contained water, it would be frozen and therefore in this case only the pilot burner can be ignited.

For this adjustment, the knob 26 is turned so that the portion 23 meshes with the smaller-diameter sector 24, which provides a less accurate temperature adjustment.

Once the pilot burner has been ignited, the knob 26 is turned so that its toothed portion 23 meshes with the larger-diameter sector 25, which as such provides a finer adjustment, allowing to adjust the temperature for example from +30° to +70° Celsius.

In this manner, when the water reaches the set temperature the main burner shuts down due to the intervention of the thermostat 12 and the valve 13 closes by way of the flow control element 18.

In practice it has been observed that the intended aim and objects of the present invention have been achieved.

In fact, by means of a single knob it is possible to adjust and control bimetal rod-and-tube-thermostat gas valves.

The execution of the adjustment and control unit by means of a single knob makes the assembly constructively simpler and more handy to use.

The invention thus conceived is susceptible of numerous modifications and variations, all of which are within the scope of the appended claims.

All the details may further be replaced with other technically equivalent elements.

In practice, the materials used, so long as they are compatible with the contingent use, as well as the dimensions, may be any according to requirements.

The disclosures in Italian Patent Application No. PD2000A000149 from which this application claims priority are incorporated herein by reference.

What is claimed is:

1. An adjustment and control unit for a gas burner valve provided with a bimetallic thermostat, and with a flow control element, the unit comprising: a rod-like element which acts on the flow control element of the valve, said thermostat being arranged at right angles on said rod-like element; a translational motion actuator being arranged so as to push at right angles on said rod-like element on an opposite side thereof with respect to said thermostat; an adjustment knob connected to said actuator; and a coupling means for coupling said knob to said actuator, said coupling means being adapted to convert rotary motion into a translational motion with two distinct transmission ratios, each at specific rotation positions.

2. The unit of claim 1, wherein said coupling means for converting rotary motion into translational motion are constituted by a gear-like portion of said translational motion actuator and by separate portions, coupling with said gear-like portion, and having front teeth provided with different radii which are connected to said knob.

3. The unit according to claim 1, wherein said coupling means comprises a cam-like element which has two separate shaped portions, is connected to said knob and acts on said rod-like element, whereby to also constitute said translational motion actuator.

4. The unit of claim 1, wherein the valve comprises a valve body to which said knob is rotatably coupled, said rod-like element being articulated to said valve body.

5. The unit of claim 4, wherein said valve body comprises a threaded portion, said translational motion actuator being constituted by a pin with a threaded portion, said threaded portion of the pin being adapted to be coupled to the threaded portion of said valve body.

6. The unit of claim 4, wherein said thermostat has a pin-like sensitive element, rested on said rod-like element, which is articulated to said valve body.

7. The unit of claim 6, wherein said rod-like element has, at a region of contact with said sensitive element, a protruding shape such as to allow contact substantially at one point only.

8. The unit of claim 7, further comprising a seat with an abutment step, provided at said valve body; a mushroom-shaped element which is slideable in said seat of the valve body and includes a head and a stem; an elastic laminar element which rests at its ends on said abutment step of said seat and is rigidly coupled to said flow control element which controls a gas path formed in the valve body and connected in input from the safety; said rod-like element resting at an end thereof on said stem and the head of said mushroom-shaped element being pushed on said elastic laminar element.

9. The unit of claim 8, wherein said translational motion actuator has a spherical head which is accommodated in a corresponding recess formed in said rod-like element.

10. The unit of claim 8, wherein said rod-like element has a spherical protrusion which is accommodated in a corresponding recess of the head of said stem of said flow control element.

* * * * *